US012612897B2

(12) United States Patent
Søgaard et al.

(10) Patent No.: US 12,612,897 B2
(45) Date of Patent: Apr. 28, 2026

(54) PERFORMING POST-MOULDING OPERATIONS ON A BLADE SEGMENT OF A WIND TURBINE BLADE

(71) Applicant: LM Wind Power A/S, Kolding (DK)

(72) Inventors: Peter Søgaard, Kolding (DK); Søren Steffensen, Kolding (DK)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/888,301

(22) Filed: Sep. 18, 2024

(65) Prior Publication Data

US 2025/0012257 A1 Jan. 9, 2025

Related U.S. Application Data

(63) Continuation of application No. 17/602,865, filed on Oct. 11, 2021, now Pat. No. 12,146,467.

(51) Int. Cl.
| | |
|---|---|
| *F03D 13/40* | (2016.01) |
| *F03D 1/06* | (2006.01) |
| *F03D 80/50* | (2016.01) |

(52) U.S. Cl.
CPC .......... *F03D 13/40* (2016.05); *F03D 1/0675* (2013.01); *F03D 80/50* (2016.05); *F05B 2230/10* (2013.01); *F05B 2230/80* (2013.01); *F05B 2260/02* (2013.01); *F05B 2260/30* (2013.01)

(58) Field of Classification Search
CPC ........ F03D 13/40; F03D 1/0675; F03D 80/50; F05B 2230/10; F05B 2230/80; F05B 2260/02; F05B 2260/30; Y02E 10/72
See application file for complete search history.

(56) References Cited

U.S. PATENT DOCUMENTS

| | | | | |
|---|---|---|---|---|
| 11,541,529 | B2 * | 1/2023 | Üyünük | B25H 1/005 |
| 11,994,100 | B2 * | 5/2024 | Roberts | F03D 80/30 |
| 2012/0124833 | A1 | 5/2012 | Arendt et al. | |
| 2012/0269643 | A1 * | 10/2012 | Hibbard | F03D 1/0675 |
| | | | | 29/889 |
| 2014/0361127 | A1 | 12/2014 | Van Der Zee | |
| 2015/0337799 | A1 * | 11/2015 | Hansen | B60P 3/40 |
| | | | | 410/44 |
| 2016/0377050 | A1 | 12/2016 | Caruso et al. | |
| 2019/0301430 | A1 * | 10/2019 | Üyünük | F16M 11/10 |

FOREIGN PATENT DOCUMENTS

| | | |
|---|---|---|
| WO | 2015162257 A1 | 10/2015 |
| WO | 2016198075 A1 | 12/2016 |

* cited by examiner

*Primary Examiner* — Ryan J. Walters
(74) *Attorney, Agent, or Firm* — Dority & Manning, P.A.

(57) ABSTRACT

The present invention relates to a method of performing at least one post-moulding operation on a blade segment (70) of a wind turbine blade. The method comprises the providing a holding device (88) for supporting the blade segment (70) at its spar structure (62), the holding device (88) comprising a coupling member (90) for engaging the spar structure (62). The blade segment (70) is held with the holding device (88) such that the spar structure (62) of the blade segment (70) is engaged by the coupling member (90), and performing at least one post-moulding operation on the shell structure (82) of the blade segment (70).

18 Claims, 4 Drawing Sheets

1

PERFORMING POST-MOULDING OPERATIONS ON A BLADE SEGMENT OF A WIND TURBINE BLADE

CROSS-REFERENCE TO RELATED APPLICATIONS

Figure 1:
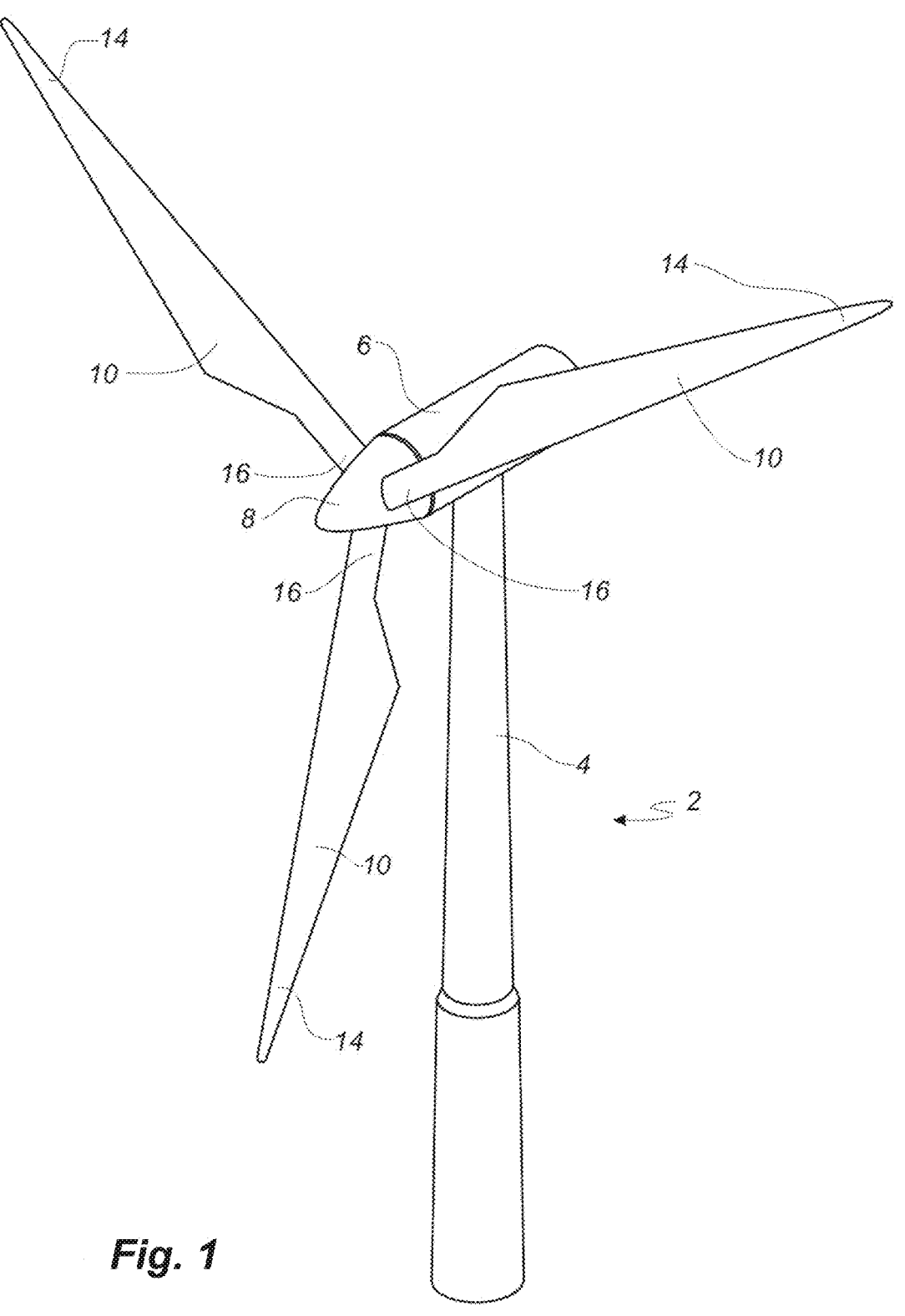

This application is a continuation of U.S. patent application Ser. No. 17/602,865, filed on Oct. 11, 2021, which is a National Phase Application filed under 35 U.S.C. § 371 as a national stage of PCT Application No. PCT/EP2020/059905, filed on Apr. 7, 2020, which claimed the benefit of European Patent Application No. 19168914.0, filed on Apr. 12, 2019, the content of each of which is hereby incorporated by reference in its entirety.

FIELD OF THE INVENTION

The present invention relates to a method of performing at least one post-moulding operation on a blade segment of a wind turbine blade and to a support assembly for performing a post-moulding operation on a blade segment of a wind turbine blade.

BACKGROUND OF THE INVENTION

Wind power provides a clean and environmentally friendly source of energy. Wind turbines usually comprise a tower, generator, gearbox, nacelle, and one or more rotor blades. The wind turbine blades capture kinetic energy of wind using known airfoil principles. Modern wind turbines may have rotor blades that exceed 90 meters in length.

Wind turbine blades are usually manufactured by forming two shell parts or shell halves from layers of woven fabric or fibre and resin. Spar caps or main laminates are placed or integrated in the shell halves and may be combined with shear webs or spar beams to form structural support members. Spar caps or main laminates may be joined to, or integrated within, the inside of the suction and pressure halves of the shell.

As the size of wind turbines increases, the manufacturing and transporting of wind turbine blades becomes more challenging and costlier. To address this, it is known to provide a wind turbine blade in two or more spanwise segments. This may result in an easier manufacturing process and may reduce the costs of transportation and erecting of wind turbines. The blade segments may be transported to the erection site where they can be assembled to form the wind turbine blade.

However, a number of challenges arise in the manufacturing of segmented wind turbine blades. In particular, a need exists for efficiently performing post-moulding operations on blade segments, in particular spanwise blade segments.

It is therefore an object of the present invention to provide an improved method of performing post-moulding operations on a blade segment, said method being cost-efficient and flexible.

It is another object of the present invention to provide a versatile and cost-efficient arrangement for use in such methods.

SUMMARY OF THE INVENTION

It has been found that one or more of the aforementioned objects can be obtained by a method of performing at least one post-moulding operation on a blade segment of a wind turbine blade, the blade segment comprising a shell structure with an open end and a spar structure arranged at least partly within the shell structure and protruding from the open end, the method comprising the steps of providing a holding device for supporting the blade segment at its spar structure, the holding device comprising a coupling member for engaging the spar structure, holding the blade segment with the holding device such that the spar structure of the blade segment is engaged by the coupling member, and performing at least one post-moulding operation on the shell structure of the blade segment.

The solution of the present invention offers several benefits. First, the cost of performing post-moulding operations is substantially lowered as the outboard part of the blade, such as a tip end segment, is free from supporting elements since it is supported at its spar structure. The rotor blade can thus be conveniently treated with one or more post-moulding operations in two or more separate pieces. Thus, the method and assembly of the present invention are found to improved accessibility of the blade segment during post-moulding operations. Also, typically two opposing support elements, such as two separate tip waggons, are required to hold a tip end blade segment, whereas only a single holding device is needed according to the present invention.

An outboard tip end blade segment can be supported at its spar structure, such as one or more spar beams, wherein the entire outer surface of the shell structure is free and available for the post-moulding operation. This also results in an improved working height as compared to prior art blade segment holding devices and also obviates the need for scaffolding.

The blade segment is preferably a spanwise blade segment comprising the tip of the wind turbine blade, i.e. a tip end blade segment. Such tip end blade segment will usually constitute up to 30% of the total blade length. The shell structure will typically comprise a pressure side shell part and a suction side shell half glued or otherwise bonded to each other. In some embodiments, the pressure side shell half and the suction side shell half are manufactured over the entire length of the wind turbine blade, i.e. over their entire final length, closed and bonded, and subsequently cut along a cutting plane substantially normal to the spanwise direction or longitudinal axis of the closed shell, resulting in a root end blade segment and a tip end blade segment. The pressure side shell half and the suction side shell half will typically be adhered or bonded to each other near the leading edge and near the trailing edge. Each shell half may comprise longitudinally/spanwise extending load carrying structures, such as one or more main laminates or spar caps, preferably comprising reinforcement fibres such as glass fibres, carbon fibres, aramid fibres, metallic fibres, such as steel fibres, or plant fibres, or mixtures thereof. The shell structure will typically be produced by infusing a fibre lay-up of fibre material with a resin such as epoxy, polyester or vinyl ester. In a preferred embodiment, the pressure side shell half and the suction side shell half are manufactured in respective mould halves, preferably by vacuum assisted resin transfer moulding. According to some embodiments, the pressure side shell half and the suction side shell half each have a total length or longitudinal extent L of 50-90 m, preferably 60-80 m.

The shell structure of the blade segment comprises an outer shell surface on which the post-moulding operation may be performed. The blade segment, such as the tip end blade segment comprises an open end, which for example is obtained by cutting the full-length shell structure along a cutting plane substantially normal to the spanwise direction or to the longitudinal axis of the closed shell, as described above. In other embodiments, the blade segment is moulded to have an open end or opening. For a tip end blade segment, the open end or opening will usually be at the end opposite to the tip, i.e. the end of the blade segment that is closer to the root end of the final blade. In some embodiments, the blade segment constitutes 10-50%, such as 20-40%, of the entire longitudinal extent of the blade.

In a preferred embodiment, the spar structure comprises a box spar, the box spar preferably comprising at least one spar beam and at least one spar flange. In some embodiments, the spar structure comprises one or more spar beams or webs. The spar structure, such as the box spar, is arranged at least partly within the shell structure of the blade segment. If the blade segment is a tip end blade segment, the spar structure may be arranged within the shell structure up to, or close to, the tip end of the blade segment and protruding from the open end. Typically, the part of the spar structure that protrudes from the open end of the blade segment, such as a tip end blade segment, is received in another blade segment, usually a root end blade segment comprising the root end of the blade, prior to bonding the two or more blade segments to each other to form the wind turbine blade. The spar structure is preferably a longitudinally extending load carrying structure, preferably comprising a beam or spar box for connecting and stabilizing the shell halves. The spar structure may be adapted to carry a substantial part of the load on the blade.

In some embodiments, a load-carrying structure of the wind turbine blade comprises a first spar structure arranged in a first spanwise blade segment and a second spar structure arranged in a second spanwise blade segment, the first and second spar structures being releasably coupled to each other, such as releasably fixed or locked to each other in the wind turbine blade. In some embodiments, the first and second spar structures are releasably coupled to each other by one or more mechanical devices. In some embodiments, the first and second spar structures are releasably coupled to each other by a mechanical locking mechanism. The first spar structure, typically arranged in a root end blade segment, may comprise an arrangement for receiving a second spar structure, which is typically arranged in a tip end blade segment. The first spar structure may comprise a hollow member or a sheath. The second spar structure may advantageously comprise a spar beam or a box spar.

The holding device of the present invention is arranged for supporting the blade segment at its spar structure, the holding device comprising a coupling member for engaging the spar structure. Preferably, a part of the spar structure is received within the coupling member of the holding device. It is particularly preferred, that the holding device is the only device supporting the blade segment, for example in a position above a ground surface, thus allowing the performance of one or more post-moulding operations on the blade segment.

The blade segment is held with the holding device such that the spar structure of the blade segment is engaged by the coupling member, wherein preferably the relative positions of the spar structure and the coupling member is fixed. Preferably, the blade segment is suspended from the holding device at its spar structure, typically such that the blade segment is suspended or mounted freely above the ground. This allows for carrying out at least one post-moulding operation on the shell structure of the blade segment in a convenient and practical manner.

In a preferred embodiment, the blade segment is a spanwise blade segment, preferably including the tip of the wind turbine blade. In some embodiments, the wind turbine blade is made up of two or more blade segments, comprising a tip end blade segment including the tip of the wind turbine blade and a root end blade segment including the root of the wind turbine blade.

In some embodiments, the blade segment is held, or suspended, with the holding device in a substantially horizontal position above a ground surface. Preferably, no part of the blade segment is in contact with the ground surface. In a preferred embodiment, the shell structure of the blade segment is freely accessible, i.e. not engaged by the holding device. Thus the shell structure of the blade segment is accessible from every side for post-moulding operations. The blade segment will usually have a substantially spanwise extending longitudinal axis generally coinciding with the spanwise extent of the wind turbine blade. As used herein, the term "longitudinal" means the axis running substantially parallel to the maximum linear dimension of the element in question. When the blade segment is held, or suspended, with the holding device in a substantially horizontal position above a ground surface, the longitudinal axis, or spanwise extent, of the blade segment will usually be substantially parallel to the ground surface.

In a preferred embodiment, the spar structure comprises a spar beam or a box spar, the box spar preferably comprising at least one spar beam and at least one spar flange. The box spar may comprise one or more shear webs bonded to spar caps at the top and bottom of the shear webs.

In some embodiments, the coupling member comprises a sheath element for receiving at least part of the spar structure. The sheath element may take the form of a tube, e.g. a tube with circular or quadrilateral or substantially box-shaped cross-section. The sheath element may have a longitudinal axis, wherein the longitudinal axis of the sheath element is substantially parallel to a ground surface. Typically, the longitudinal axis or spanwise extent of the blade segment will be aligned with a longitudinal axis of the coupling member or sheath element. The sheath element may comprise one or more internal ribs for aligning with, or abutting, the spar structure, such as the box spar. In a typical embodiment, a part of the spar structure of the blade segment is inserted into the coupling member, typically into the sheath element thereof. In some embodiments at least 50%, such as at least 80% or at least 90%, or 100% of the length of the protruding part of the spar structure is received within the sheath element. According to some embodiments, the sheath element is substantially box-shaped. In other embodiments the sheath element is hollow.

In a preferred embodiment, the coupling member, in particular a sheath element thereof, is rotatable around its longitudinal axis. In some embodiments, the sheath element is rotatable 360° around its longitudinal axis. Thus, the blade segment can be rotated around its longitudinal axis or spanwise extent.

According to another embodiment, the holding device further comprises actuation means for rotating the coupling member, such as the sheath element, around its longitudinal axis. The actuation means may comprise a motor or drive unit, for example for driving a chain-based device for rotating the sheath element, for example a tube, receiving part of the spar structure of the blade segment.

According to another embodiment, the spar structure is fastened to the coupling member by one of more pins, such as one or more locking pins, extending through the coupling member and the spar structure. In a preferred embodiment, the coupling member comprises a sheath element, wherein opposing holes are provided through the sheath element, said holes being alignable with corresponding opposing holes provided the spar structure for receiving a pin in the respective holes. Thus, the relative positions of the coupling member and the blade segment can be fixed, for example during rotation of the coupling member. In one embodiment, the spar structure is fastened to the coupling member using a chordwise pin and radial pin extending through the coupling member and the spar structure. It is preferred that at least on locking pin is inserted into aligned respective apertures in each of the coupling member and the spar structure to fixate the spar structure to the coupling member.

In a preferred embodiment, the holding device further comprises a counterweight for balancing the weight of the supported blade segment. In some embodiments, the holding device further comprises a bearing for rotatably receiving a spanwise extending appendage of the spar structure. The appendage may comprise a pin or rod extending from the spar structure in a spanwise direction. Typically, the bearing is aligned with the coupling member to receive the appendage, which is usually the outermost part of the spar structure.

In a preferred embodiment, the holding device further comprises a movable support member preferably comprising a plurality of wheels. The movable support member may comprise a roller board device, a roll-table or a sliding table. Typically, the other elements of the holding device, for example the coupling member and/or counterweight, are arranged on said movable support member.

According to another embodiment, the blade segment is not supported at its shell structure. Thus, preferably the holding device is not engaging the shell structure of the blade segment. Advantageously, the shell structure is completely free and accessible for performing one or more post-moulding operations. In a preferred embodiment, the blade segment comprises a tip end of the blade.

According to another embodiment, the post-moulding operation is selected from a blade shell repair operation, involving a repair of any minor defects in a cured blade shell; a blade shell cutting or grinding operation, wherein a portion of a surface of the cured blade shell can be cut away or ground to present a relatively smooth profile; a blade root flange coupling operation, wherein a pair of blade root flanges which are provided on first and second blade shells are coupled together to form a single integral blade root flange; a gluing operation, wherein an adhesive is applied to a surface of a blade shell to bond components or blade shells together; a coating operation, wherein an external surface of a blade shell is coated with a coating layer, e.g. a gel coat or suitable erosion resistant material; a laminate installation operation, wherein a main laminate or other element of the interior of a wind turbine blade may be fixed to an internal surface of one of the blade shells for positioning in the interior of a wind turbine blade; an overlamination operation; installation of internal blade components, e.g. load or deflection monitoring sensors, lightning protection systems, etc.; a survey of blade shell geometry; a secondary curing operation in, for example, an oven; or any other suitable manufacturing or assembly operations. Preferably, the post-moulding operation comprises a grinding operation, wherein at least a portion of the outer surface of the shell structure of the blade segment is ground. In one embodiment, the post-moulding operation comprises a coating operation, wherein at least a portion of the outer surface of the shell structure of the blade segment is coated.

In another aspect, the present invention relates to a blade segment obtainable by the above-described method.

In another aspect, the present invention relates to a support assembly for performing a post-moulding operation on a blade segment of a wind turbine blade, the support assembly comprising a spanwise blade segment of a segmented wind turbine blade, the blade segment comprising a shell structure with an open end and a spar structure arranged at least partly within the shell structure and protruding from the open end, and a holding device for supporting the blade segment at its spar structure, the holding device comprising a coupling member for engaging the spar structure.

The features of the blade segment and the holding device are described above with respect to the method of the present invention.

According to another embodiment, the support assembly is a mobile support assembly. It is preferred that the support assembly comprises one or more wheels or rolls such that the support assembly can be pushed or hauled to a desired location.

In another aspect, the present invention relates to a holding device for use in a method according to the present invention, the holding device comprising a coupling member for engaging a spar structure of a blade segment.

In another aspect, the present invention relates to a method of manufacturing a wind turbine blade comprising a method of performing at least one post-moulding operation on a blade segment as described above. The present invention also relates to a wind turbine blade obtainable by that method.

Embodiments and features described above with respect to the method of performing at least one post-moulding operation on a blade segment may likewise apply to, and may be combined with, embodiments and features described above with respect to the support assembly for performing a post-moulding operation on a blade segment or with respect to the holding device of the present invention, and vice versa.

As used herein, the term "spanwise" is used to describe the orientation of a measurement or element along the blade from its root end to its tip end. In some embodiments, spanwise is the direction along the longitudinal axis and longitudinal extent of the wind turbine blade. A spanwise blade segment generally relates to one of multiple segments aligned along a spanwise axis of wind turbine blade, such as a root end segment or a tip end segment.

DESCRIPTION OF THE INVENTION

Figures 2, 3:
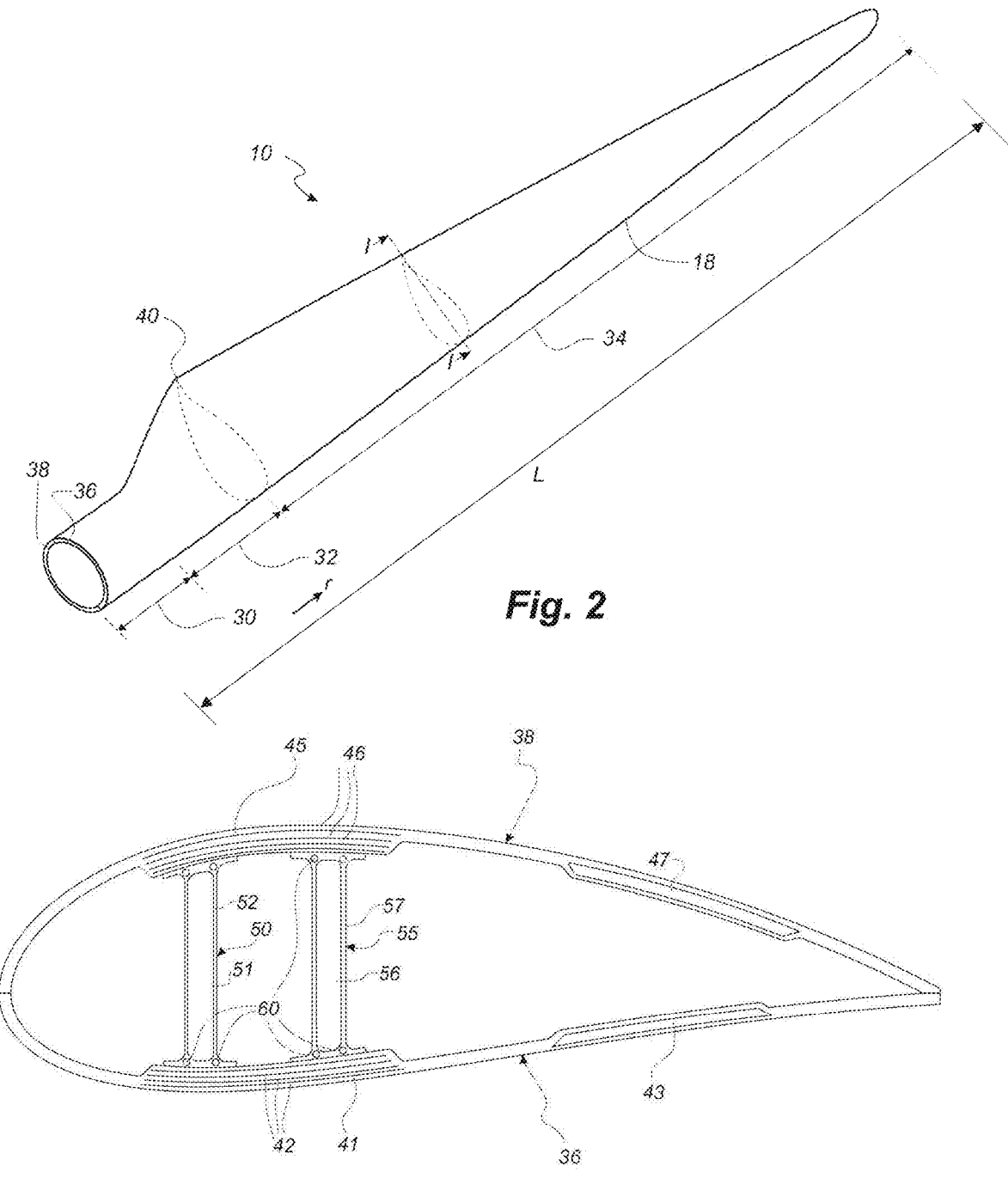
Figures 4, 5, 6:
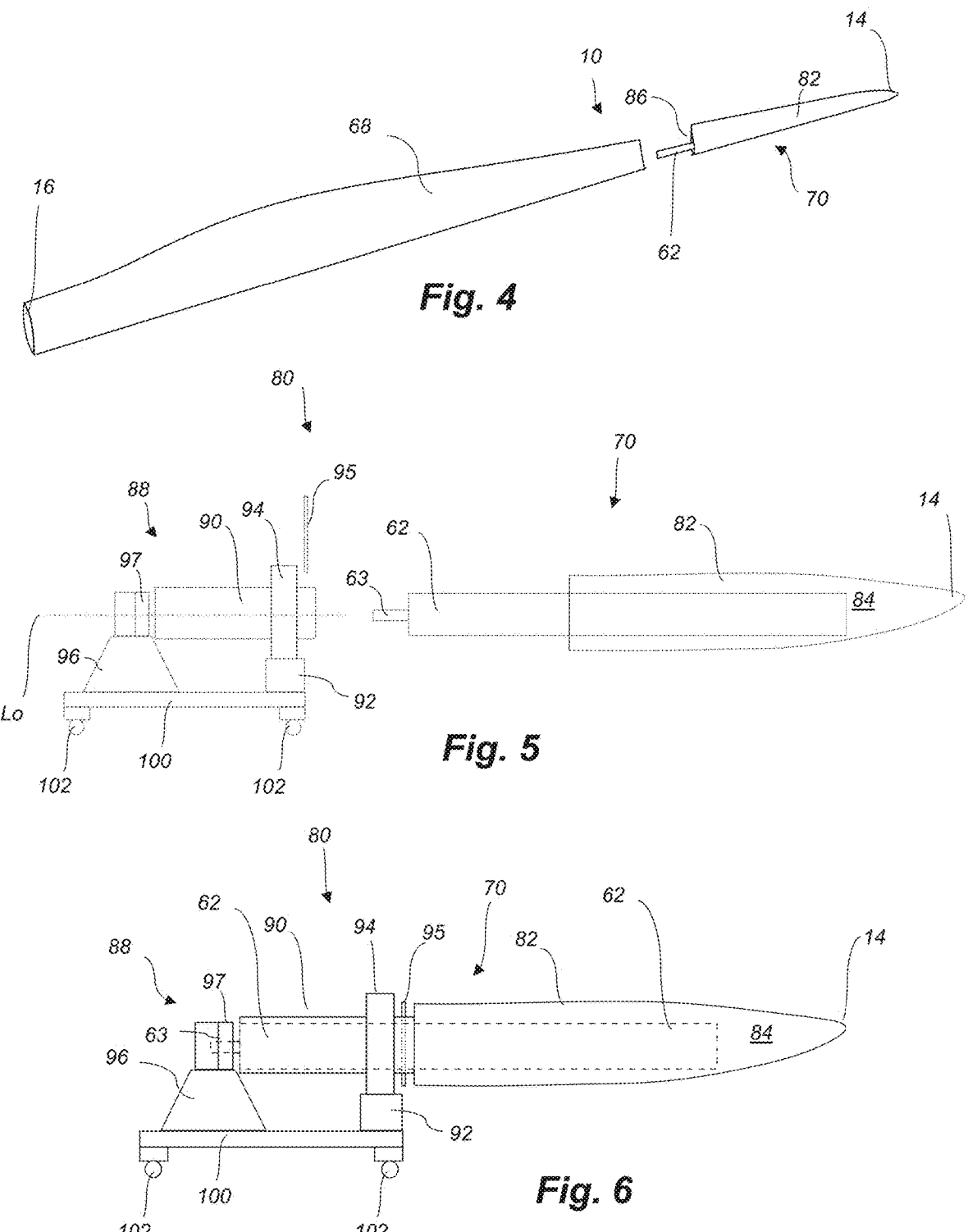
Figure 7:
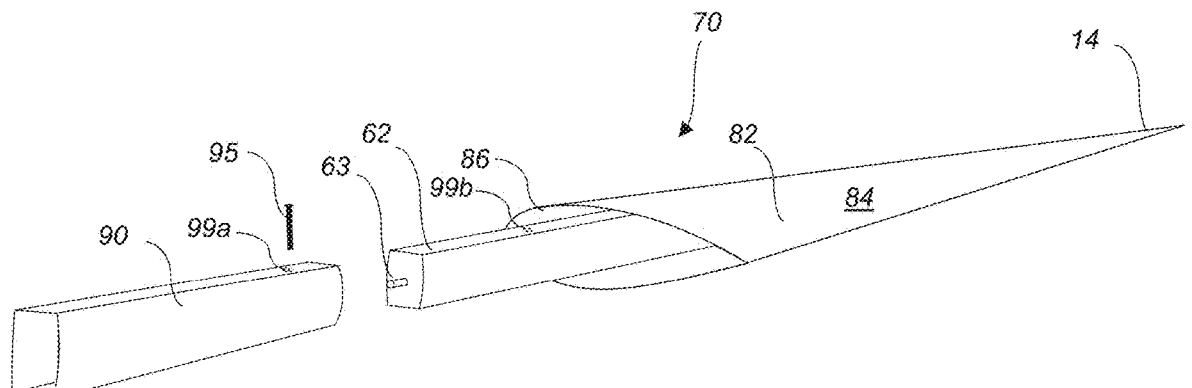

The invention is explained in detail below with reference to an embodiment shown in the drawings, in which FIG. 1 shows a wind turbine, FIG. 2 shows a schematic view of a wind turbine blade, FIG. 3 shows a schematic view of a cross-section of a wind turbine blade, FIG. 4 is a perspective view of blade segments of a wind turbine blade according to the present invention, FIG. 5 is a schematic side view of a support assembly of the present invention in a disassembled state, FIG. 6 is a schematic side view of a support assembly of the present invention in an assembled state, and FIG. 7 is a partial perspective view illustrating a blade segment and a coupling member according to the present invention.

DETAILED DESCRIPTION

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8. The rotor has a radius denoted R.

FIG. 2 shows a schematic view of a wind turbine blade 10. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34. FIG. 2 also illustrates the longitudinal extent L, length or longitudinal axis of the blade.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade is typically made from a pressure side shell part 36 and a suction side shell part 38 that are glued to each other along bond lines at the leading edge 18 and the trailing edge of the blade 20.

FIG. 3 shows a schematic view of a cross section of the blade along the line I-I shown in FIG. 2. As previously mentioned, the blade 10 comprises a pressure side shell part 36 and a suction side shell part 38. The pressure side shell part 36 comprises a spar cap 41, also called a main laminate, which constitutes a load bearing part of the pressure side shell part 36. The spar cap 41 comprises a plurality of fibre layers 42 mainly comprising unidirectional fibres aligned along the longitudinal direction of the blade in order to provide stiffness to the blade. The suction side shell part 38 also comprises a spar cap 45 comprising a plurality of fibre layers 46. The pressure side shell part 38 may also comprise a sandwich core material 43 typically made of balsawood or foamed polymer and sandwiched between a number of fibre-reinforced skin layers. The sandwich core material 43 is used to provide stiffness to the shell in order to ensure that the shell substantially maintains its aerodynamic profile during rotation of the blade. Similarly, the suction side shell part 38 may also comprise a sandwich core material 47.

The spar cap 41 of the pressure side shell part 36 and the spar cap 45 of the suction side shell part 38 are connected via a first shear web 50 and a second shear web 55. The shear webs 50, 55 are in the shown embodiment shaped as substantially I-shaped webs. The first shear web 50 comprises a shear web body and two web foot flanges. The shear web body comprises a sandwich core material 51, such as balsawood or foamed polymer, covered by a number of skin layers 52 made of a number of fibre layers. The blade shells 36, 38 may comprise further fibre-reinforcement at the leading edge and the trailing edge. Typically, the shell parts 36, 38 are bonded to each other via glue flanges.

FIG. 4 is a schematic perspective view of two spanwise segments 68, 70 of a wind turbine blade 10 according to the present invention. In this embodiment, the blade comprises a first blade segment 68, such as a root segment, and a second blade segment 70, such as a tip segment. A spar structure 62 is arranged within the second blade segment 70 and protrudes from the same.

FIGS. 5 and 6 illustrate a support assembly 80 for performing a post-moulding operation on a blade segment of a wind turbine blade according to the present invention. FIG. 5 shows a dissembled state, whereas FIG. 6 shows an assembled state. The support assembly 80 comprises a spanwise blade segment 70 of a segmented wind turbine blade. The blade segment 70 comprises a shell structure 82 having an outer shell surface 84 and comprising the tip 14 of the later wind turbine blade. The blade segment 70 has an open end 86, as seen in FIGS. 4 and 7, and a spar structure 62 arranged at least partly within the shell structure 82 and protruding from the open end 86.

The support assembly 80 comprises a holding device 88 for supporting the blade segment 70 at its spar structure 62. The holding device 88 comprises a coupling member 90 for engaging the spar structure 62. In the illustrated embodiment the coupling member 90 has the form of a sheath element that receives part of the spar structure 62 therein. The sheath element is advantageously rotatable around its longitudinal axis Lo for rotating the blade segment 70 during or in between post-moulding operations.

As seen in FIG. 6, the blade segment is held in a substantially horizontal position above a ground surface. Thus, the outer shell surface is accessible for post-moulding operations such as a shell repair operation, a shell grinding operation or a shell coating operation. The holding device 88 further comprises actuation means including chain-type rotation means 94 and a motor 92 for driving the chain for rotating the coupling member around its longitudinal axis Lo. The holding device 88 further comprises a counterweight 96 for balancing the weight of the supported blade segment 70.

Also, the spar structure is fastened to the coupling member 90 by a pin 95 extending through the coupling member 90 and the spar structure 62. This is illustrated in the partial perspective view of FIG. 7 showing an embodiment with a spar structure 62 in the form of a box spar and a coupling member 90 having a corresponding cross section for receiving the box spar (remaining parts of holding device not shown). Alignable holes 90a, 62a may be provided in the coupling member 90 and the spar structure 62 to receive the pin 95. Thus, during rotation of the coupling member 90, the relative position of the spar structure to the coupling member is fixed.

As also seen in FIGS. 5 and 6, the holding device 88 comprises a bearing 97 for rotatably receiving a spanwise extending appendage 63 of the spar structure 62. In addition, the holding device 88 comprises a movable support member 100, such as a roll table or wagon, comprising a plurality of wheels 102.

The invention is not limited to the embodiments described herein and may be modified or adapted without departing from the scope of the present invention.

LIST OF REFERENCE NUMERALS 4 tower
6 nacelle
8 hub
10 blades
14 blade tip
16 blade root
18 leading edge
20 trailing edge
30 root region
32 transition region
34 airfoil region
36 pressure side shell part
38 suction side shell part
40 shoulder
41 spar cap
42 fibre layers
43 sandwich core material
45 spar cap
46 fibre layers
47 sandwich core material
50 first shear web
51 core member
52 skin layers
55 second shear web
56 sandwich core material of second shear web
57 skin layers of second shear web
60 filler ropes
62 spar structure
63 appendage
68 first blade segment
70 second blade segment
80 support assembly
82 shell structure
84 outer shell surface
86 open end of blade segment
88 holding device
90 coupling member
92 motor
94 chain-type rotation means
95 pin
96 counterweight
97 bearing
99 holes
100 roll table
102 wheels
L length
r distance from hub
R rotor radius

The invention claimed is:

1. A holding device (88), comprising:
a coupling member (90) configured for engaging a spar structure (62) of a spanwise blade segment (70) of a wind turbine blade,
wherein the holding device (88) is configured to hold and support the spanwise blade segment (70) at a spar structure (62) thereof such that the spar structure (62) of the blade segment (70) is engaged by the coupling member while at least one post-moulding operation is performed on a shell structure (82) of the spanwise blade segment (70),
wherein the holding device (88) further comprises actuation means for rotating the coupling member (90) around a longitudinal axis thereof, and
wherein the actuation means comprises a motor or a drive unit.

2. The holding device according to claim 1, wherein the coupling member (90) comprises a sheath element for receiving at least part of the spar structure (62).

3. The holding device according to claim 2, wherein the sheath element is rotatable around a longitudinal axis thereof.

4. The holding device according to claim 1, further comprising one or more pins for fastening the spar structure (62) to the coupling member (90), the one of more pins extending through the coupling member (90) and the spar structure (62).

5. The holding device according to claim 1, wherein the holding device (88) further comprises a counterweight for balancing a weight of the spanwise blade segment (70) when the spanwise blade segment (70) is supported.

6. The holding device according to claim 1, wherein the holding device (88) further comprises a bearing for rotatably receiving a spanwise extending appendage of the spar structure (62).

7. The holding device according to claim 1, wherein the holding device (88) further comprises a movable support member comprising a plurality of wheels.

8. An assembly, comprising:
a spanwise blade segment (70) of a segmented wind turbine blade, the spanwise blade segment (70) comprising a shell structure (82) with an open end (86) and a spar structure (62) arranged at least partly within the shell structure (82) and protruding from the open end (86); and
a holding device (88) for supporting the blade segment (70) at the spar structure (62) thereof, the holding device (88) comprising a coupling member (90) for engaging the spar structure (62),
wherein the holding device (88) further comprises actuation means for rotating the coupling member (90) around a longitudinal axis thereof, and
wherein the actuation means comprises a motor or a drive unit.

9. The assembly according to claim 8, wherein the support assembly is a mobile support assembly comprising a rollable base.

10. The assembly according to claim 8, wherein the spanwise blade segment (70) includes a tip of the wind turbine blade.

11. The assembly according to claim 8, wherein the spanwise blade segment (70) is held in a substantially horizontal position above a ground surface.

12. The assembly according to claim 8, wherein the spanwise blade segment (70) is supported at a location other than the shell structure (82).

13. The assembly according to claim 8, wherein the coupling member (90) comprises a sheath element for receiving at least part of the spar structure (62).

14. The assembly according to claim 13, wherein the sheath element is rotatable around a longitudinal axis thereof.

15. The assembly according to claim 8, wherein the spar structure (62) is fastened to the coupling member (90) by one of more pins extending through the coupling member (90) and the spar structure (62).

16. The assembly according to claim 8, wherein the holding device (88) further comprises a counterweight for balancing a weight of the spanwise blade segment (70) when the spanwise blade segment (70) is supported.

17. The assembly according to claim 8, wherein the holding device (88) further comprises a bearing for rotatably receiving a spanwise extending appendage of the spar structure (62).

18. The assembly according to claim 8, wherein the holding device (88) further comprises a movable support member comprising a plurality of wheels.

\* \* \* \* \*